United States Patent Office 3,457,047
Patented July 22, 1969

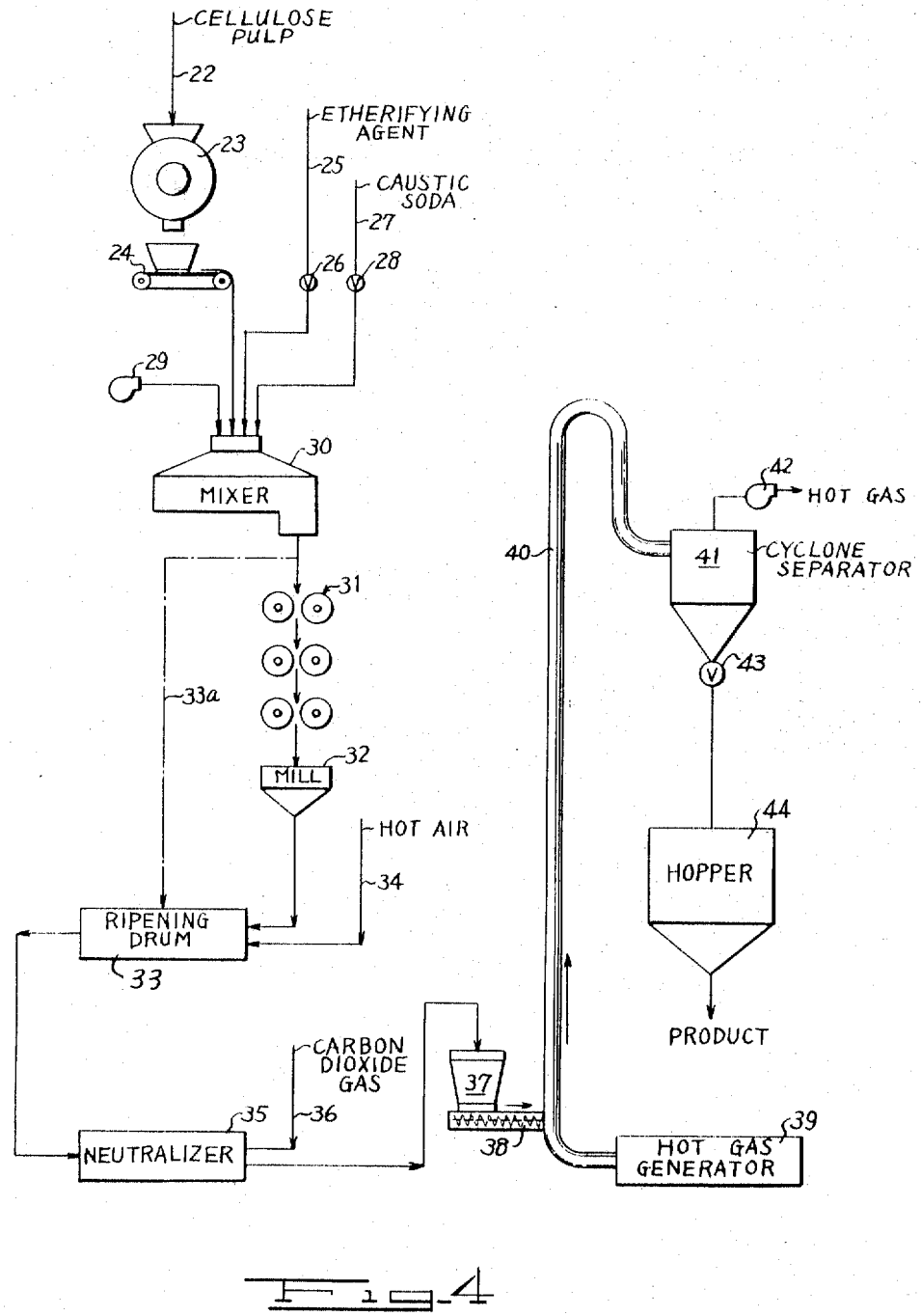

3,457,047
APPARATUS FOR PRODUCING CELLULOSE
DERIVATIVES AND THE LIKE
Kenji Tokimatsu, Marugame-shi, and Hachiro Yamashita,
Urawa-shi, Japan, assignors to Shikoku Kasei Kogyo
Company Limited, Marugame-shi, Japan
Original application Feb. 20, 1962, Ser. No. 174,525, now
Patent No. 3,322,748. Divided and this application
June 21, 1966, Ser. No. 574,846
Int. Cl. B01f 7/10; C08b 15/04
U.S. Cl. 23—260                              3 Claims

ABSTRACT OF THE DISCLOSURE

Apparatus for processing pulverized solid cellulose pulp comprises a mixer having a plurality of concentric rotary circular disks in spaced vertical and parallel relation and adapted for receiving pulverized cellulose pulp and an etherifying agent and an alkaline agent in respective operative amounts for flinging the pulp and agents radially outwards in the form of film-like sprays of mist which are guided into contacting relationship by a guide in the form of a conical extension on at least one of the disks. The mixed pulp and agents are then fed to a roller means, a ripening drum, a neutralizer and a dryer in that order.

---

This application is a division of our earlier application Ser. No. 174,525, filed Feb. 20, 1962 and now issued as U.S. Patent 3,322,748.

The invention relates to apparatus for producing cellulose derivatives and more particularly sodium carboxymethyl cellulose.

A characteristic feature of a preferred embodiment of this invention is to mix pulverized cellulose pulp with alkaline and etherifying or other reacting agents such as ethylene oxide instantly and uniformly by using a particular mixing technique in order to make the cellulose pulp react with the alkaline and etherifying or other reacting agents quickly and effectively to produce sodium carboxymethyl cellulose or other cellulose derivatives such as hydroxyethyl cellulose, ethyl cellulose, methyl cellulose and so forth.

An object of this invention is to produce a cellulose derivative such as sodium carboxymethyl cellulose quickly with high reaction efficiency.

Another object is to produce a cellulose derivative such as sodium carboxymethyl cellulose economically with high yield.

Other objects will become hereinafter apparent from the following description of apparatus for producing sodium carboxymethyl cellulose as illustrated in the accompanying drawing which shows examples of mixer apparatus used to practice the invention and in which:

FIG. 4 is a diagrammatic illustration of a system used to practice this invention.

Figure 1:
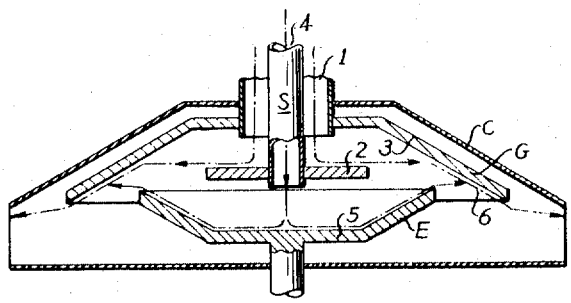
FIGURE 1 is a vertical section of a first example of a mixer of the invention employing rotary circular disks.

One conventional batch process for producing sodium carboxymethyl cellulose consists of mercerizing cellulose such as by steeping cellulose pulp sheets in a caustic solution, removing the excess steeping soution, and kneading the resulting product with pulverized sodium chloracetic acid in a suitable vessel such as a Werner-Pfleiderer mixer to etherify the material.

Another conventional process consists of kneading chips of cellulose pulp sheets with chloracetic acid or its sodium salt and of the gradual addition of caustic solution to etherify and mercerize the material simultaneously.

In such etherifying processes, chloracetic acid has the tendency of decomposing into glycolic acid and sodium chloride in alkaline solution, and this decomposition is remarkably accelerated in the presence of a great quantity of water.

The decomposition of chloracetic acid itself occurs due to the presence of excess alkali at temperature above 30° C. Excess water is also harmful, as alkali cellulose is hydrolyzed by the excess water into cellulose and free alkali which will decompose chloracetic acid. An alkali adsorption of cellulose is increased by using a concentrated alkali solution, it is desirable to mercerize cellulose with a concentrated alkali solution to reduce the amount of free alkali remaining.

However, cellulose pulp is not easily mercerized with a concentrated alkali solution such as a 45% caustic soda solution, because of the resulting quick swelling of its surface unless it has been previously pulverized.

As in this invention pulverized pulp and concentrated caustic soda solution are used for the mercerization the reaction efficiency is thus greatly increased.

In the conventional processes mentioned above, as the distribution and diffusion of the agents are not uniformly attained and a decomposition of chloracetic acid is caused by local heat evolution, the reaction efficiency is not good. Consequently, it is very difficult to perform this type of reaction with an efficiency above 50 percent.

Furthermore, the above processes require much labor and there is a delayed reaction time on account of the poor efficiency of the mixing and kneading processes. Therefore, these conventional processes usually result in relatively small productivity in spite of large installation costs.

With respect to continuous and semi-continuous processes, these can be effected using the same principle. One such process consists of the continuous suffusing of an aqueous solution of chloracetic acid and caustic soda onto cellulose pulp in the form of a continuous sheet, and another consists of adding the two agents to pulverized cellulose pulp by spraying nozzles in a rotary drum and mixing the contents by tumbling action.

Although these processes are more economical than batch processes, the distribution, diffusion and contact between the agents and cellulose are not always effected uniformly and the reaction efficiency thereof is low.

In order to abate the non-uniformity of the diffusion of the agents and to restrain secondary reactions in order to increase the availability of chloracetic acid, some organic solvents such as methyl, ethyl or propyl alcohol, and acetone and benzene are used instead of water. By such processes, known generally as solvent processes, it is possible to provide a low degree of etherification with a reaction efficiency of above 70 percent. However, this process is not always the best, because of the expensive character of the solvent recovery, the costly solvent loss, the hazard of explosion, and the bulky product which results.

This invention relates to apparatus which carries out an improved process for producing sodium carboxymethyl cellulose by which mixing of the agents and cellulose pulp is effected instantaneously, continuously and uniformly while using a minimum amount of water and while obtaining a reaction efficiency of more than 70 percent.

Because this process can be continuously and instantly performed, there is achieved a high productivity in spite of low installation costs and despite the fact that relatively few man hours are required. Also, the invention offers a cheap product having good qualities.

In producing sodium carboxymethyl cellulose by the process of this invention, pulverized cellulose pulp having a particle size finer than 30 mesh screen size and the major portion of which is capable of passing through a 100 mesh screen, is fed onto a rotating circular disk which rotates at high speed in a mixer. The pulp is spread as a thin film on said disk due to centrifugal force and is discharged in a film-like jet of mist from the edge of said disk. The agents, such as a solution of caustic soda or chloracetic acid, are fed onto another rotating circular disk, which rotates below the first said disk and are also discharged as a film-like jet of mist which is directed to collide with said pulp mist to be instantly mixed therewith.

As two rotating disks can be provided for two agents, simultaneous mixing of an alkaline agent, such as caustic soda or sodium carbonate, and an etherifying agent, such as chloracetic acid or its sodium salt, with said pulverized pulp can be easily effected. Also it is possible to use these agents either in solid pulverized state or in liquid state.

As the cellulose pulp and the agents are to be fed continuously into said mixer and instantly mixed together, according to the invention, the amount and rate of charging materials must be exactly controlled. Intermittent supplies of the raw materials cannot be permitted. A suitable constant ratio feeding machine, such as a belt, screw or table feeder, can be used for pulverized pulp or powdered sodium chloracetic acid, and a constant-ratio pump can be used for feeding liquid materials such as caustic soda or chloracetic acid solution.

Some examples of the mixing methods of the present invention will next be explained in detail with reference to the drawing.

FIGURE 1 shows a mixer for mixing an agent with pulverized pulp. Pulverized pulp fed by a constant-ratio feeder is led through a supply opening 1 of the casing C of a mixer onto a rotating circular and planar disk 2 supported on hollow shaft S and is spread by centrifugal force toward another rotating circular disk 3 which is generally conical and is rotating in the same direction as disk 2 such that the pulp is dispersed as a film-like jet of mist.

At the same time, powdered chloracetic acid or its sodium salt which has been fed by another feeder, or an aqueous solution of an etherifying agent such as caustic soda or the like which has been fed by a pump, is led through another supply opening 4 onto another rotating circular disk 5 whereby said powdered or aqueous solution is spread in a film-like jet of mist. The two jets which are thus flung centrifugally in a radially outwards direction relative to a determinable axis, collide and are uniformly mixed along the circular line 6 on disk 3 due to the presence of a peripheral conical extension E on disk 5 and conical guide G.

In applying this mixer to the present process, two mixers of this type can be used in series. The pulverized pulp and caustic soda solution which have been mixed in the primary mercerizing mixer give powdered alkali cellulose, which is fed into the secondary etherifying mixer and mixed with chloracetic acid or its sodium salt to get sodium carboxymethyl cellulose.

This process can be attained by the reverse procedure wherein pulverized cellulose pulp and an etherifying agent are fed into the primary mixer, and then the product from said primary mixer and caustic soda solution is fed into the secondary mixer.

Also, it is possible to feed pulverized pulp and powdered chloracetic acid or its sodium salt through a single supply opening 1 by using two constant-ratio feeders, caustic soda solution being fed via another supply opening 4 to mix those three materials simultaneously in one mixer.

As to heat generation during mixing, it is necessary to hold the temperature of the mixed product below 35° C. by supplying cool air or gas via supply opening 1.

Figure 2:
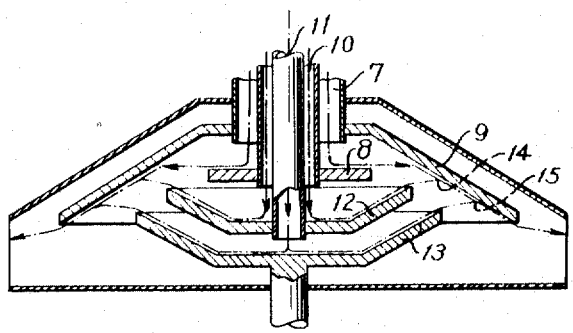
FIGURE 2 is a vertical section of a second example of a mixer of the invention with rotary circular disks.

FIGURE 2 shows a mixer for the simultaneous mixing of the alkaline agent and etherifying agent with pulverized pulp. This mixer comprises rotating circular disks 8, 9, 12 and 13. Disk 8 is planar but disks 9, 12 and 13 have conical sections whereof the conical sections of disks 12 and 13 are inverted with respect to that of disk 9.

In the mixer of FIGURE 2, pulverized cellulose pulp is continuously fed via supply opening 7 onto the disk 8 and is spread by centrifugal force toward the disk 9 such that said pulp is spread as a film-like jet of mist. Powdered etherifying agent or its solution and a solution of caustic soda which have been respectively fed via supply openings 10 and 11 onto the disks 12 and 13 are spread respectively by centrifugal forces as film-like jets of mist. These three materials are uniformly mixed along the circular lines 14 and 15 on disk 9.

Cooling air or gas can be also supplied via supply openings 7 to hold the temperature of the mixed materials below 35° C.

Figure 3:
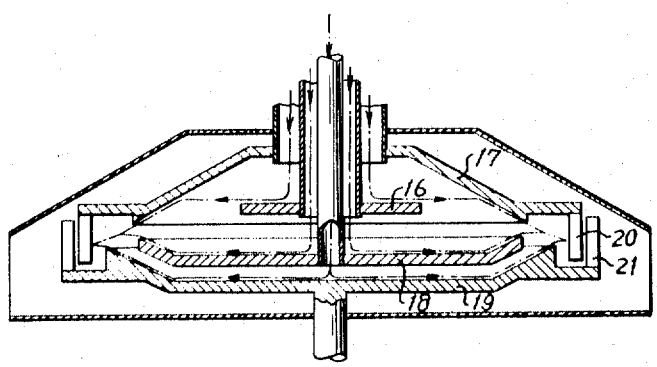
FIGURE 3 is a vertical section of third example of a mixer with rotary circular disks.

FIGURE 3 shows a mixer which is similar to the mixer shown in FIGURE 2 in that there are four disks 16, 17, 18 and 19. However, in this embodiment there are furthermore peripheral breaking pins 20 and 21 respectively at the edges of said disks 17 and 19 in order to increase the mixing. Cooling air or gas can be also supplied via said openings.

FIGURE 4 is an illustration of an overall apparatus for producing crude sodium carboxymethyl cellulose employing the mixer shown in FIGURES 2 or 3.

In FIGURE 4, cellulose pulp 22 in sheet form is fed into pulp pulverizer 23 and is pulverized by many sharp knife edges (not shown) into a particle size finer than 30 mesh screen size with the major portion of the particles being capable of passing through a 100 mesh screen. The pulverized pulp is continuously fed into mixer 30 at a constant rate by a belt feeder 24 by which feeding rates are controlled.

An etherifying agent 25, such as an aqueous solution of chloracetic acid, its sodium salt, or chloracetic acid partially neutralized by sodium carbonate, is fed into said mixer 30 by a feeding pump 26 which controls the feeding rate. A solution of caustic soda 27 is similarly fed into said mixer 30 by a feeding pump 28. Cooling air can be led into said mixer 30 by a blower 29 to hold the temperature of the product below 35° C. These three materials are mixed uniformly and instantly in said mixer 30 which is, for example, of the structure shown in FIGURES 2 and 3.

The product from said mixer 30 can be directly fed into ripening drum 33, via line 33a for the production of the technical grade of the product, or the product can be subjected to a kneading treatment by means of multiple-roll kneader 31, which is used for a special quality of the product, to wit, transparency when the product is dissolved in water. The multiple-roll kneader 31 consists of pairs of rollers which are arranged in series, whereby said product fed from said mixer 30 is subjected to kneading, tearing, streaching, folding and shearing actions. By these actions, fine particles of sodium chloracetic acid on the surfaces of cellulse pulp penetrate into the cellulose fibers.

The inner surfaces of said rollers are cooled by cooling water to hold the temperature below 30° C. of mixture throughout the kneading process. Although temperature above 30° do not harm the properties of the product, sodium carboxymethyl cellulose formed at elevated temperatures dissolved in water changes into a bird-line state which would cause trouble in subsequent processes.

Following the kneading and after dispersion in a break up mill 32, the material is treated in the ripening drum 33.

As the speed of the etherifying reaction for cellulose is quite small at temperatures below 30° C., the mixture treated by the mixing and kneading processes has only slightly changed into sodium carboxymethyl cellulose. However, it can be easily reacted to form sodium carboxymethyl cellulose by elevating its temperature up to above 60° C. because the agents and the cellulose pulp have been intimately and uniformly mixed.

For so raising the temperature, the ripening drum 33 is composed of a cylindrical rotary drum wherein the temperature of the mixture is elevated to a range between 60 and 75° C. by the injection of hot air 34 with a suitable humidity. The time the contents are retained in ripening drum 33 is from 20 to 60 minutes corresponding to the ripening temperature.

As there remains after the ripening process some excess caustic soda which might cause a decrease of polymerization or a burning of the product at its drying, it is desirable to neutralize the free alkali with acid unless an alkaline product is required. Therefore, the material may be led into a neutralizer 35 which is a cylindrical rotary drum, wherein the material is neutralized with carbon dioxide gas 36. As the neutralization is usually enough to change the free caustic soda into sodium carbonate, it can be completed in a few minutes. It is to be noted that it is economical to use the carbon dioxide gas which has been formed during the preparation of the etherifying agent, such as the sodium chloracetic acid or partially neutralized chloracetic acid which is prepared by adding sodium carbonate to chloracetic acid.

The neutralized material from neutralizer 35 is led into a hopper 37 and fed into an upright drying pipe or tower 40 by a screw conveyor 38 wherein the mixture is mixed with hot gas generated by a hot gas generator 39, the temperature being above 150 to 200° C. As the neutralized material usually contains about 30 to 40 percent moisture, the temperature of said hot gas is reduced instantly to below 100° C. by instant evaporation of the contained moisture. The hot gas ascends through the upright drying pipe 40 with said neutralized material and is led into a cyclone separator 41, wherein temperature is held to a range between 60 and 80° C., whereby the dried product is separated from the hot gas which is exhausted by a fan 42.

The dried product from the cyclone separator 41, containing about 3 percent moisture, is charged into a hopper 44 through a rotary valve 43.

As the product obtained by this process is fine powder, it is not necessary to pulverize the product further for conventional demands.

As mentioned above, a remarkable feature of this invention is the mixing of cellulose pulp and processing agents instantly and uniformly, while the etherifying reaction can be also attained by using a minimum amount of water medium, the temperature of the whole process being exactly controlled so that the decomposition of the etherifying agents caused by secondary reaction can be restrained.

The process of this invention produces sodium carboxymethyl cellulose with a high efficiency and high productivity which cannot be realized by any other process using water. As will be mentioned hereinafter, it is possible to obtain a completely soluble sodium carboxymethyl cellulose with a reaction efficiency about 85 percent. Such a high reaction efficiency can be obtained only by a process using a substantial quantity of organic solvent other than for the process of this invention which uses no expensive organic solvent. Consequently, this invention offers a much more economical process for producing sodium carboxymethyl cellulose than heretofore known. Further, even the product of low degree of etherification, such as about 0.5 which is obtained by this process, can completely be dissolved in water.

Another feature of this invention is the keeping of the material in such a fine state throughout the process that the kneading, ripening, neutralizing and drying can be continuously performed in short time. Only an hour is required for the material to pass through the whole process.

Further, this process offers the possibility of obtaining a product of high viscosity becauseof its short treating time as there is no chance to reduce the degree of polymerization.

In manufacturing cellulose derivatives, such as alkyl or hydroxy-alkyl-cellulose, excessive free alkali and moisture in the alkali-cellulose would decompose added alkylating or hydroxylating agents by side reactions in case of alkylation of hydroxy-alkylation of the alkali-cellulose, whereby the reaction efficiency would be remarkably decreased. Therefore, the properties of the alkali-cellulose for manufacturing these cellulose derivatives includes that the cellulose is uniformly mercerized and contains neither excessive moisture nor free alkali.

In the process of this invention, the preferred alkali-cellulose, uniformly mercerized and containing the least excess moisture and free alkali, can be instantly obtained by a mixing in said mixer in FIGURE 1. The pulverized cellulose pulp has a size of about 60 mesh. An amount of concentrated caustic soda aqueous solution such as 30–70% can be used and this is less than that of any known process. As the alkali-cellulose obtained by this method is a fine powder and has the desirable properties mentioned above, the second step of the reaction such as alkylation can be profitably performed by using said alkali-cellulose.

The following specific examples are illustrative of preferred methods to produce cellulose derivatives.

EXAMPLE 1

100 pounds of purified and pulverized sulfite cellulose pulp and 123 pounds of aqueous 45 percent solution of caustic soda were charged into a primary mixer as shown in FIGURE 1 and mixed to prepare alkali cellulose.

233 pounds of pulverized alkali cellulose and 73.5 pounds of 65 percent aqueous solution of chloracetic acid were fed into a similar secondary mixer. Cooling air, the temperature of which was 5° C., was supplied into the secondary mixer to keep the temperature of the mixture at 35° C.

Then the mixture was kneaded for about 20 minutes while its temperature was kept below 35° C. The mixture was then treated by ripening and drying processes.

The degree of etherification (D.E.) of the product was 0.66, and the reaction efficiency (R.E.) of the chloroacetic acid was 73 percent. The product was quite soluble in water.

EXAMPLE 2

100 pounds of purified and pulverized sulfite cellulose pulp and 60 pounds of powdered sodium chloracetic acid were fed by the constant-ratio feeders through the supply opening 1 into the mixer shown in FIGURE 1.

On the other hand, 125 pounds of 28 percent aqueous solution of caustic soda were fed by a constant-ratio pump through the supply opening 4 of that mixer.

The mixture was treated by the same process as in Example 1.

The D.E. of the product was 0.63 and the R.E. of chloracetic acid was 70 percent. This product was quite soluble in water.

EXAMPLE 3

100 pounds of purified and pulverized sulfite cellulose pulp were continuously fed through supply opening 7 into a mixer as shown in FIGURE 2.

58 pounds of 75 percent solution of chloracetic acid were fed through supply opening 10, and 145 pounds of a 40 percent aqeous solution of caustic soda were fed through the supply opening 11 and continuously mixed together.

Cooling air was supplied through the opening 7 to remove the heat of neutralization, and the mixture was then treated as in Example 1. The D.E. of the product was 0.6 and the R.E. of chloracetic acid was 75 percent.

EXAMPLE 4

100 pounds of purified and pulverized sulfite pulp were fed into a mixer as shown in FIGURE 3, and 79 pounds of etherifying solution, which had been previously prepared by partially neutralizing 70 parts of a 54 percent aqueous solution of chloracetic acid with 15 parts of sodium carbonate anhydrate and 104 pounds of a 40 percent aqueous solution of caustic soda were also supplied. Cooling air was fed during their mixing.

The mixture was treated immediately by the ripening and drying processes.

The D.E. of the product was 0.3 and the R.E. of chloracetic acid was 71 percent, and the product was fairly soluble in water.

EXAMPLE 5

100 pounds of purified and pulverized sulfite cellulose pulp and 142 pounds of aqueous solution of 40% caustic soda were fed into the mixer shown in FIG. 1 to obtain alkali-cellulose having 38% water and 23.5% alkali.

242 pounds of this alkali-cellulose and 28.9 pounds of ethylene oxide were fed into a reaction vessel. The reaction continued for 1.5 hours at atmospheric pressure and 45° C. The reaction product was purified by methanol washing and was dried. The average D.E. was 0.8 and the R.E. of ethylene oxide was 70%. The hydroxyethyl cellulose produced was quite soluble in water.

EXAMPLE 6

100 pounds of purified and pulverized sulfite cellulose pulp and 124 pounds of aqueous solution of 50% caustic soda were fed into a mixer as shown in FIG. 1, to obtain alkali-cellulose having 30.8% water and 27.7% alkali. 224 pounds of this alkali-cellulose and 100 pounds of methyl chloride were fed into an autoclave for methylation. The reaction continued 4 hours at 10 atmospheric pressures and 80°–90° C. Then excessive methyl chloride was released and 33.4 pounds of its recovered.

The reaction product was purified by washing in hot water at 90° C. and dried. The D.E. of the product was 1.6 and the R.E. of methyl chloride was 69.5%. The ethyl cellulose produced was quite soluble in water.

The D.E. of other product obtained after treating the mixture delivered from the mixer first by multiple roll kneader process and then by ordinary processes, such as ripening, neutralizing and drying, was 0.56, and the R.E. of chloracetic acid was an average of 80 percent. The R.E. of chloracetic acid by this process reached 85 percent. This product was quite soluble in water in spite of its low degree of substitution. The time required for this process was 35 minutes.

What is claimed is:

1. Apparatus for processing pulverized solid cellulose pulp comprising a source of an etherifying agent, a source of an alkaline agent, a mixer including concentric rotary circular disks in spaced vertical and parallel relation, means for rotating said disks, said mixer having supply openings respectively associated with said disks and adapted for respectively receiving said pulp and agents, means to operatively convey the pulp and agents to said supply openings and thus to said disks, said disks flinging said pulp and agents radially outwards in the form of film-like sprays of mist, guide means in the mixer for guiding the sprays into contacting relation, said guide means including a guide in said mixer for deflecting the sprays, cooling means to cool the thusly mixed pulp and agents, roller means to receive the mixed pulp and agents to knead the same, cooling means to cool said roller means, ripening means to receive the mixed pulp and agents from the roller means, air heating means to inject hot humid air into the ripening means to raise the temperature of the mixed pulp and agents to about 60–75° centigrade to obtain a ripened product, hopper and screw conveyor means to remove the ripened product from the ripening means, neutralizing means between the ripening means and hopper and screw conveyor means to neutralize the product with carbon dioxide, a drying tower associated with the latter said means, a source of hot air coupled to the tower to blow the product upwardly therethrough and to dry the product, a cyclone separator coupled to the tower to separate the dried product from the hot air, and means to collect the separated product.

2. Apparatus comprising pulverizing means for pulverizing solid cellulose pulp, a source of an etherifying agent, a source of an alkaline agent, a mixer including concentric rotary circular disks in spaced vertical and parallel relation, means for rotating said disks, said mixer having supply openings respectively associated with said disks and adapted for receiving selected of said pulp and agents, means operatively associated with said pulverizing means and sources to convey the pulp and agents to said supply openings and thus to said disks, said disks flinging said pulp and agents radially outwards in the form of film-like sprays of mist, guide means in the mixer for guiding the sprays into contacting relation, said guide means including a conical extension on at least one of said disks, cooling means to cool the thusly mixed pulp and agents, roller means to receive the mixed pulp and agents to knead the same, cooling means to cool said roller means, ripening means to receive the mixed pulp and agents from the roller means, air heating means to inject hot humid air into the ripening means to raise the temperature of the mixed pulp and agents to about 60–75° centigrade to obtain a ripened product, hopper and screw conveyor means to remove the ripened product from the ripening means, neutralizing means between the ripening means and hopper and screw conveyor means to neutralize the product with carbon dioxide, a drying tower associated with the latter said means, a source of hot air coupled to the tower to blow the product upwardly therethrough and to dry the product, a cyclone separator coupled to the tower to separate the dried product from the hot air, and means to collect the separated product.

3. Apparatus comprising pulverizing means for pulverizing cellulose pulp, a source of an etherifying agent, a source of an alkaline agent, a mixer including concentric rotary circular disks in spaced vertical and parallel relation, means for rotating said disks, said mixer having supply openings respectively associated with said disks and adapted for receiving selected of said pulp and agents, means operatively associated with said pulverizing means and sources to convey the pulp and agents to said supply openings and thus to said disks, said disks flinging said pulp and agents radially outwards in the form of a film-like spray of mist, guide means in the mixer for guiding the sprays into contacting relation, said guide means including a conical extension on at least one of said disks, roller means to receive the mixed pulp and agents to knead the same, ripening means to receive the mixed pulp and agents from the roller means, conveyor means to remove the ripened product from the ripening means, neutralizing means between the ripening means and conveyor means to neutralize the product, and drying means to dry the product.

References Cited

FOREIGN PATENTS 838,593  5/1952  Germany.

JAMES H. TAYMAN, Jr., Primary Examiner

U.S. Cl. X.R.

23—252, 285; 159—4; 241—39, 46.17, 188; 259—6, 24; 260—212, 231; 261—88